Patented Nov. 30, 1948

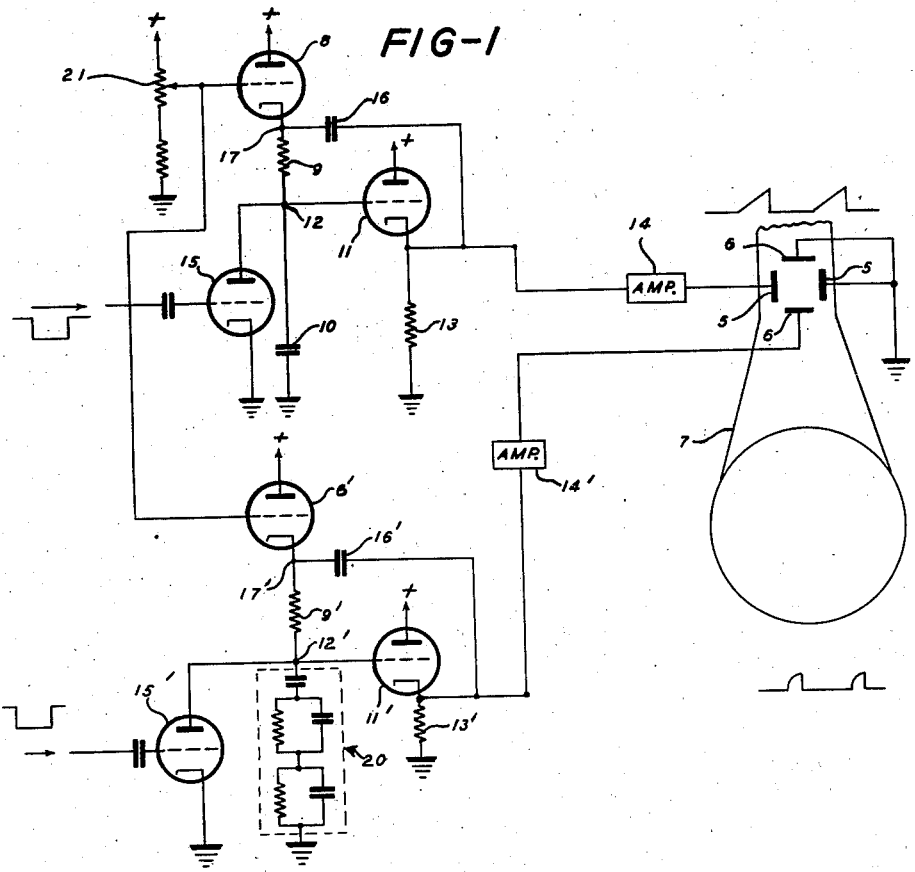

2,455,283

UNITED STATES PATENT OFFICE 2,455,283

INDICATING SYSTEM

George E. Valley, Jr., Cambridge, Mass., assignor, by mesne assignments, to the United States of America as represented by the Secretary of War Application November 4, 1944, Serial No. 561,990

2 Claims. (Cl. 315—24)

This invention relates to electronic indicators for radio object-locating systems or like apparatus and particularly to the sweep circuits of the cathode ray oscilloscopes utilized in airborne radio object-locating equipment.

Where a visual indication of the approach of aircraft to a target is used as a tactical or navigational aid, it may be desirable, in order to obtain the necessary degree of accuracy, that the operator change the range scale on the cathode ray oscilloscope whereby the range of the system is shortened as the aircraft nears its target.

Heretofore it has been the practice to change range settings by manipulation of a switching device or the like, thereby to alter certain circuit parameters in a definite step or series of steps. Occasionally in such a system, when the operator switches to a shorter range the target has been lost momentarily due to the disturbance of the circuits affected by the change.

It is a primary object of the present invention to provide a circuit for effecting a smooth stepless transition from one range setting to another of the indicating system so that interruption of the functioning of the various circuits will be obviated.

The present invention has been developed particularly for the purpose of improving the operation of airborne radio object-locating equipment of the type which provides a map-like presentation of the areas being scanned on a cathode ray oscilloscope. A linear X-sweep and a hyperbolic Y-sweep are incorporated in the indicator circuit, and it is contemplated that as the range is varied, the time variation or slope of each of these sweeps will be varied accordingly. Thus, another object of the invention is to vary both the X and Y scales in a continuous manner through the medium of a single control. However, it will be appreciated that the invention is capable of wider application wherever it is desired to accomplish range expansion or contraction as a smooth, continuous operation rather than by discrete range intervals.

In the drawings:

Fig. 1 is a schematic circuit diagram illustrating the application of one embodiment of this invention to a typical indicator circuit; and Fig. 2 comprises a set of timing diagrams showing the relation between various voltage pulses in the circuit illustrated in Fig. 1.

Referring to Fig. 1, a circuit is shown for providing X-sweep and Y-sweep voltages, which are respectively applied to the horizontal and vertical deflecting plates 5 and 6 of a cathode ray tube 7. It will be understood, however, that deflecting coils, instead of plates, may be used. The portion of the circuit for producing the X-sweep voltage is shown in the upper part of Fig. 1. The cathode of a triode 8 is connected through a resistor 9 to one side of a condenser 10, the other side of this condenser being grounded. The plate of the tube 8 is connected to a suitable source of positive voltage (not shown). As will be described hereinafter, a variable positive potential is applied to the grid of the tube 8 for a purpose which will be explained later. The grid of a triode 11 is connected to a point 12 at the junction of resistor 9 and condenser 10. The tube 11 is utilized as a cathode follower, the cathode of this tube being connected by a load resistor 13 to ground and the plate thereof being connected to a positive voltage source. The deflecting voltage for the X-sweep is obtained from the load resistor 13 and, after being passed through a sweep amplifier 14, is applied to the horizontal deflecting plates 5 of the cathode ray tube 7.

Normally, the condenser 10 is effectively short-circuited by a clamping tube 15 which has its plate connected to junction point 12, and its cathode connected to ground. The initiation of the X-sweep is accomplished by applying a negative pulse from a conventional flip-flop circuit (not shown) to the grid of the tube 15. This biases the tube 15 to cut-off and thereby removes the short-circuit from the condenser 10. The condenser 10 thereupon commences to charge, and as the voltage across this condenser builds up, it is amplified by the cathode follower 11 and the sweep amplifier 14. For the purpose of making the charging characteristic of the condenser 10 substantially linear, a feedback path is afforded through a condenser 16 which connects the cathode of tube 11 to the cathode of tube 8. Normally, when the condenser 10 is short-circuited by the tube 15, the condenser 16 is charged to a voltage substantially equal to the drop through the resistor 9. The capacity of the condenser 16 is chosen sufficiently large in comparison with that of condenser 10 so that the time constant of condenser 16 and its associated circuit is large compared with the sweep period of the cathode ray tube. As the voltage across the cathode follower load resistance 13 increases, the voltage level at the junction point 17 of the condenser 16 and cathode of tube 8 is gradually raised thereby producing a substantially linear voltage variation with respect to time instead of one which follows an exponential curve.

The portion of the sweep circuit which produces the Y-sweep is shown in the lower part of Fig. 1 and is substantially identical to the X-sweep portion except that in place of the single condenser 10, a resistance-capacity network generally designated 20 is utilized for producing a hyperbolic time variation of voltage. Corresponding elements in the X-sweep and Y-sweep portions are numbered alike except for the addition of primes to the reference characters thereof. The condenser 16' serves to insure a true hyperbolic sweep as the network 20 is charged.

Referring to Fig. 2, pulses from a suitable timer are employed to trigger a flip-flop circuit (not shown) at regular intervals. A negative gate generated by this circuit is applied to the grid of tube 15 thereby initiating the X-sweep. Similarly, the application of a negative gate to the grid of tube 15' shuts this tube off and initiates the Y-sweep. However, the Y-sweep must be delayed in relation to the initiation of the X-sweep in order to compensate for the height of the aircraft, as is familiar to those skilled in the art. Such time delay may be accomplished in the circuit which forms these gates. When the Y-sweep voltage attains a predetermined amplitude, which is fixed for all ranges, action takes place in the circuit to terminate both the X-sweep and the Y-sweep simultaneously by removing the negative gates from the grids of the clamping tubes 15 and 15', thus restoring the circuit to its normal condition until the succeeding timing pulse occurs. Any suitable means well known in the art may be employed to effect this terminating action and disclosure thereof is not believed essential to the present invention.

For a given range there is a definite time required for each of the X and Y-sweeps to traverse the cathode ray tube screen; or in other words, a certain time should elapse during which the controlling sweep voltage (in this instance the Y-sweep) builds up to the predetermined level. To change the scale of the map presentation on the scope, it is necessary that the time in which the sweep voltage attains this limiting amplitude be varied; that is, the slope of the voltage-time characteristic is given greater or less value depending upon whether the presentation is to be enlarged or diminished. In the present instance the change in the voltage build-up rate is accomplished by changing the positive bias on the grids of the tubes 8 and 8'. A potentiometer 21 is provided for this purpose, both of these grids being electrically connected to the movable contact member of the potentiometer. Varying the positive bias in this manner effects a continuous variation in the initial voltage which is impressed on the resistance-capacity networks 9-10 and 9'-20 when the respective clamping tubes 15 and 15' are cut off, thereby smoothly altering the sweep speeds.

An outstanding advantage of the potentiometer arrangements for varying the range of the system is that it minimizes the disturbing effects upon the sweep circuit and enables smooth range expansion or contraction to be performed by the operator. Thus the likelihood of losing the target during changeover from one range to another is greatly reduced, if not eliminated. This is of great advantage in bombing operations, for example, as the target is being approached. Other applications will readily occur to those skilled in the art.

While I have illustrated and described a selected embodiment of my invention it is apparent that variations and modifications may be made without departing from the spirit of the invention. Hence I do not desire to limit the invention to the precise details described herein but wish to avail myself of all improvements and modifications within the purview of the following claims.

I claim:

1. In a variable range radio object-locating system indicator having a cathode ray tube provided with horizontal and vertical deflecting elements, the combination of, horizontal and vertical sweep control means including resistance and capacitance elements, said means determining the sweep speeds in accordance with the rate of charge of said capacitance elements, voltage-applying means including a plurality of electron tubes for impressing charging voltages respectively on said capacitance elements, and a potentiometer for simultaneously varying the grid bias of said electron tubes thereby to effect gradual variations in said charging voltages when changing the range of said indicator.

2. In a variable range radio object-locating system indicator having a cathode ray tube provided with horizontal and vertical deflecting elements, a horizontal and vertical sweep control including separate resistance-capacitance networks for the horizontal and vertical sweep controls respectively, means for determining the horizontal sweep speed in accordance with the rate of charge of a capacitance element in one of said resistance-capacity networks, means for determining the vertical sweep speed in accordance with the rate of charge of a capacitance element in the other of said resistance-capacitance networks, means including a plurality of electron tubes for applying charging voltages to said capacitance elements, and a potentiometer for simultaneously varying the grid bias of said electron tubes to effect stepless variations in said charging voltages.

GEORGE E. VALLEY, Jr.

REFERENCES CITED

The following references are of record in the file of this patent:

UNITED STATES PATENTS

| Number | Name | Date |
|---|---|---|
| 2,305,930 | Martinelli | Dec. 22, 1942 |
| 2,315,848 | Geohegan | Apr. 6, 1943 |
| 2,350,069 | Schrader et al. | May 30, 1944 |